June 4, 1957 W. M. HANNEMAN 2,794,476
PYRAMIDAL SHEET METAL LOCK WASHER
Filed Sept. 10, 1956 2 Sheets-Sheet 2
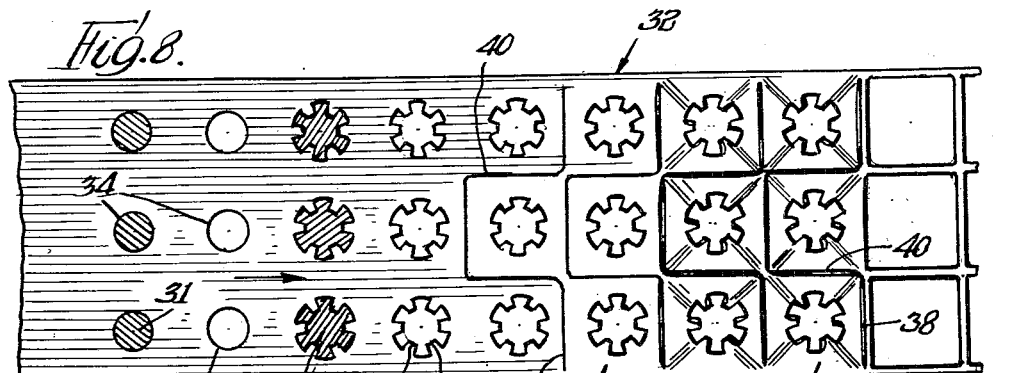
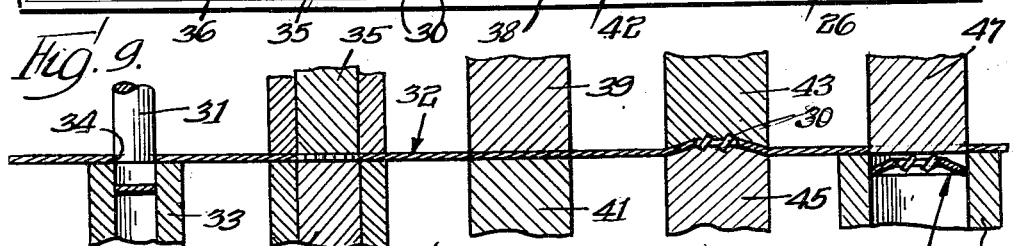
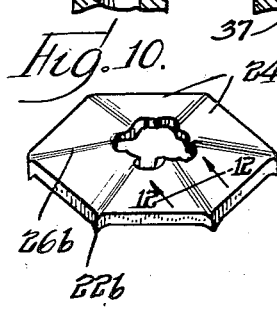
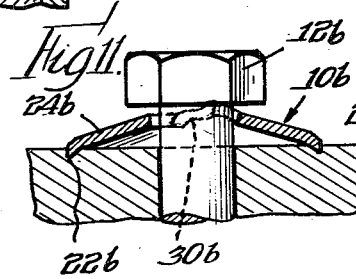
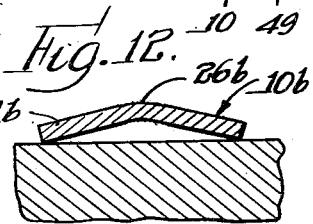
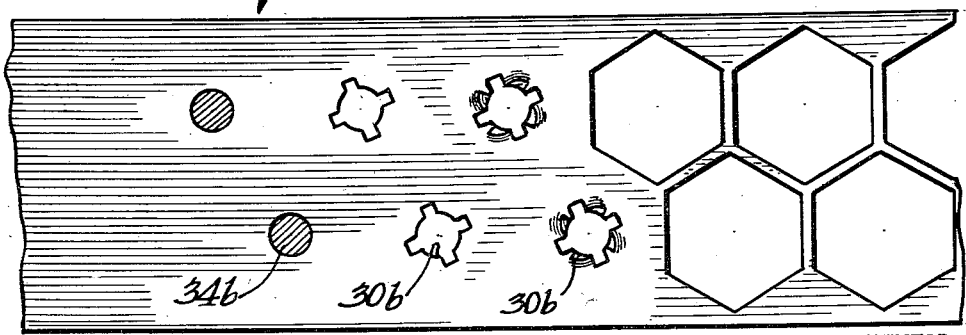
INVENTOR.
Walter M. Hanneman
BY
Olson & Trexler
attys.

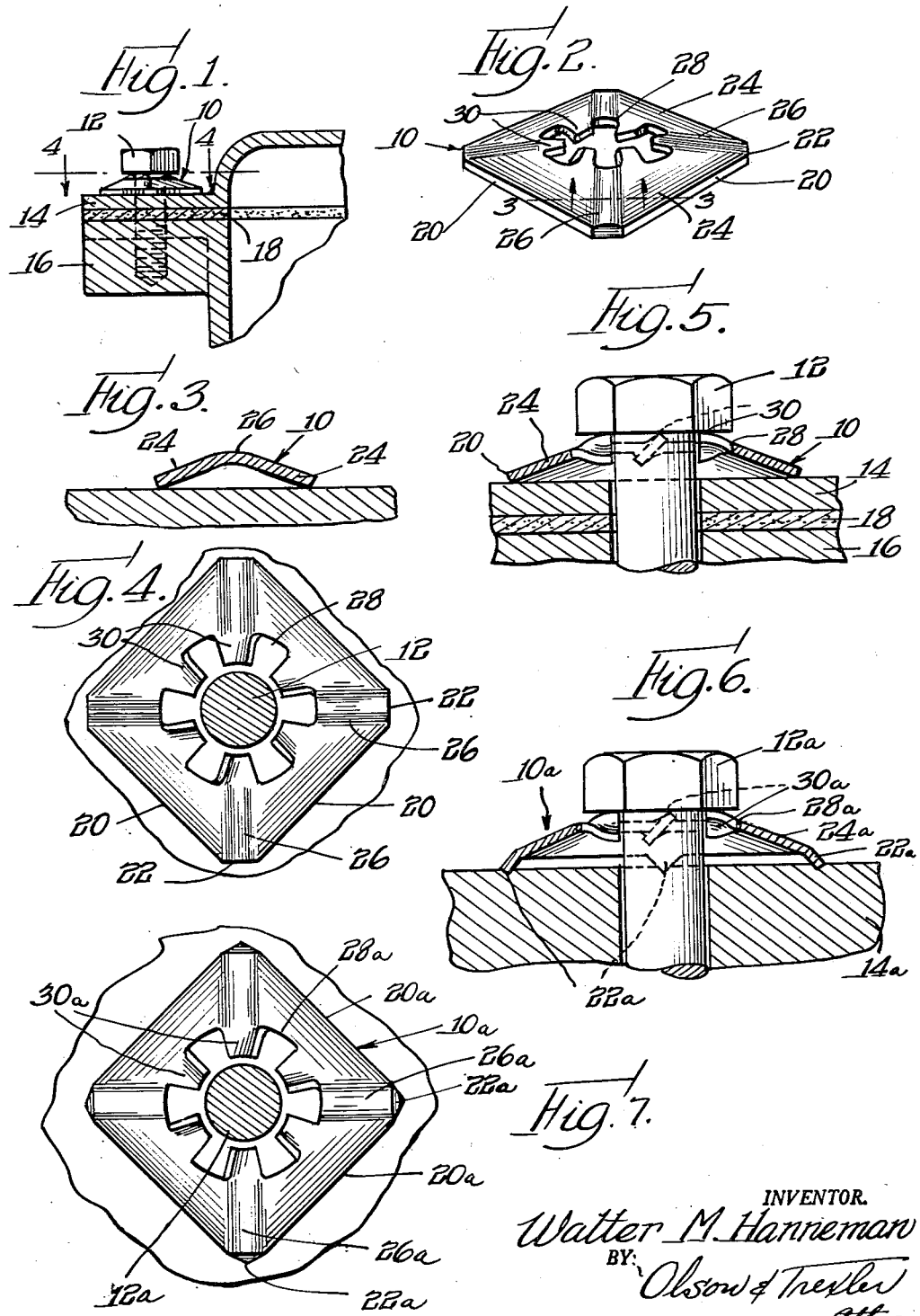

United States Patent Office 2,794,476
Patented June 4, 1957

2,794,476

PYRAMIDAL SHEET METAL LOCK WASHER

Walter M. Hanneman, Wheaton, Ill., assignor to Illinois Tool Works, Chicago, Ill., a corporation of Illinois Application September 10, 1956, Serial No. 608,901

5 Claims. (Cl. 151—35)

This invention is concerned generally with the fastening art, and more particularly with a washer of novel construction and a novel method of making the washer. This application is a continuation-in-part of my co-pending application filed September 27, 1955, Serial No. 536,999.

In many instances it is desirable to provide a washer which will transmit the thrust or clamping force of a bolt head over an area substantially larger than the bolt head. In the past this often has been done by the use of a conical or concave-convex washer of circular outline. Such washers have proved satisfactory in many installations, but in other uses have been found to be unsatisfactory. For example, when a conical type washer has been used under a hex head screw in combination with a cork gasket located between a case and a cover which the washer has been compressed against, the washer has caused deformation of the cover, resulting in leakage adjacent the screw or bolt hole.

Accordingly, it is a general object of this invention to provide a novel washer and method of making the same eliminating the defects of the prior art conical washers, and possessing many advantages not found in such prior art washers.

It is another object of this invention to provide a washer of the type discussed which covers a greater area than a round washer of the same diameter.

A further object of this invention is to provide a washer of the type under consideration which is capable of exerting a greater pressure on the associated workpiece without collapsing than are prior art washers with which I am familiar.

More specifically, it is an object of this invention to provide a dished out washer which will not turn inside out under stress.

A further object of this invention is to provide novel washers of the above described type constructed so as substantially to eliminate any possibility of the washers cracking under pressure and to provide a novel method of producing such washers readily and economically.

A still further object of the present invention is to provide a novel conical-type washer and method of producing such a washer from sheet material whereby stretching and thinning of the material in the washer body is limited to predetermined localized areas which facilitates flexing of the washer body under pressure in a manner which improves the ruggedness and holding power of the washer.

Another object of this invention is to provide a substantially scrapless washer of the type under consideration.

Yet another object of this invention is to provide a washer of the type discussed including means engaging the workpiece to prevent the washer from turning under load.

Other and further objects and advantages of the present invention will be apparent from the following description when taken in connection with the accompanying drawings wherein:

Fig. 1 is a side view showing the washer as used, the associated work parts being shown in section;

Fig. 2 is a perspective view of the washer;

Fig. 3 is an enlarged fragmentary sectional view through the washer as taken along the lines 3—3 in Fig. 2;

Fig. 4 is a plan view of the washer;

Fig. 5 is a cross sectional view through the washer as assembled with a bolt and a workpiece;

Fig. 6 is a view similar to Fig. 5 showing a modification of the washer;

Fig. 7 is a plan view of the modified washer of Fig. 6;

Fig. 8 is a plan view illustrating the method of forming the washers of the present invention;

Fig. 9 is a partially diagrammatic sectional view showing the method of forming the washers;

Fig. 10 is a perspective view showing a modified form of the present invention;

Fig. 11 is a sectional view of the modified washer in a work assembly;

Fig. 12 is an enlarged fragmentary sectional view taken along line 12—12 in Fig. 10; and Fig. 13 is a plan view showing the method of producing the washer of Figs. 10-12.

Referring now in greater particularity to the drawings and first to Figs. 1–5, there will be seen a washer 10 constructed in accordance with the principles of the invention and utilized in combination with a hex head screw or bolt 12, and a cover 14 held on a body 16 with a cork gasket 18 interposed between the cover and the body. The washer 10 is of generally square outline having straight edges 20. The corners of the washer are cut off 22 on a straight line perpendicular to a line from the center of the square outline to the corresponding corner.

Besides having a square outline, the washer 10 is of generally pyramidal shape. The pyramidal shape of the washer comprises four flat surfaces or sides 24 joined as rounded ribs or corrugations 26. The washer is provided with a center hole 28, and twisted locking teeth 30 extend radially into the hole 28.

It is important to note that the thickness of the sides 24 is substantially uniform from their outer margins to their inner margins and which thickness is also the same as the thickness of the stock material from which the washer is formed, but, as shown in an exaggerated manner in Fig. 3, corners or ribs 26 are somewhat thinner than the sides 24. In other words, during the formation of the pyramidal washer from a flat sheet of stock material, the side portions 24 are merely shifted without stretching and thinning thereof while the rib portions are stretched and thinned in order to accomplish the pyramidal shape. Furthermore, the washer is formed so that all of the rib portions 26 are disposed at an angle to the grain of the stock material in order to prevent the washer from cracking both during formation of the washer and when the washer is used and placed under pressure. It has been found that the washer as heretofore shown and described is much stiffer in compression than prior art washers with which I am familiar. It is believed that one reason for this is that when a load is placed on the washer, the stresses are concentrated in the vicinity of the rib portion, which portions are relatively stiff and are supported by a strut-like action provided by the flat side sections therebetween but are thinned sufficiently to permit resilient flexing of the washer in a predetermined amount. Since the distance across the corners of the washer is greater than the diameter of an equivalent conical washer, the pressure of the washer is distributed over a greater area, thereby avoiding deformation of the workpiece such as the cover 14. The ribs or corrugations 26 also prevent the lock washer from loosing pressure on the outer periphery, and it has been found that much greater pressure is necessary on the cut off corners 22 to flatten the washer than is needed to flatten a conventional conical washer.

A modification of the invention is shown in Figs. 6 and 7. The washer and other parts as shown in Figs. 6 and 7 are generally similar to those heretofore shown and described with regard to Figs. 1–5. Accordingly, to obviate the necessity of extended and repeated discription, similar parts are identified by the use of similar numerals with the addition of the suffix a. The hex head screw or bolt 12a and the work parts including the cover 14a remain as previously described. The pyramidal washer 10a remains of substantially the same construction as in the prior form, but the corners instead of being cut off are turned down as at 22a to form sharp points cutting into the cover 14a or other workpiece and preventing rotation of the washer relative to the work. The twisted locking teeth 30a, of course, prevent rotation of the screw or bolt relative to the washer in such a manner as to effect loosening of the screw or bolt, the same as in the previous form of the invention.

It will be observed that for a given amount of stock the minimum dimension of one of the washers, that is the dimension between two of the parallel sides, is the same as the diameter of a conical washer of circular outline. At the same time, the dimension from the center of the washer out to the corner thereof is substantially greater than the radius of a corresponding conical washer of circular outline.

Referring now particularly to Figs. 8 and 9, the manner of producing the above described washers in accordance with the present invention will be described. Preferably, the washers are formed from an elongated strip 32 of stock material or metal, which strip is intermittently fed in the direction of the arrow by suitable means, not shown. It is important to note that the strip 32 of stock material is formed so that the grain of the metal extends, in this particular embodiment, either parallel to or perpendicular to the longitudinal axis of the strip. At a first work station cooperable punch members 31 and 33 form holes 34 in the strip to provide the start of the center holes in the washers to be formed. At the next work station cooperable dies 35 and 37 form notches 36 in the margins of the apertures or holes 34 to complete the center holes 28 of the washers and to provide the prongs or teeth 30. At a subsequent work station upper and lower dies 39 and 41 cut transverse slits 38 and longitudinal slits 40 in the strip 32 to define polygonal or rectangular washer blanks 42, which slits terminate short of the corners of the blanks 42 so that the blanks remain integral with the strip. At the next work station dies 43 and 45 form the washer blank sections 42 into pyramidal shapes and twist the prongs 30 about their radial axes, which radial axes are inclined with respect to the central axis of the washer blank substantially the same amount as the sides of the washer. It is important to note that the washer blanks are formed into pyramidal shapes in a manner so that the resulting ribs or corrugation 26 are all diagonally disposed with respect to the longitudinal axis of the sheet material strip 32, or, in other words, the rib portions are all angularly disposed with respect to the grain of the stock material. In this embodiment the height of the pyramidal shape of the washers is relatively great as compared with the thickness of the stock material of the strip 32, but thinning of the flat side sections 24 of the washers is prevented during the formation of the pyramidal shapes since the edges of the score lines 38 and 40 pull apart as shown in an exaggerated manner. However, the above mentioned thinning of the rib sections 26 is accomplished since these rib or corner sections are integrally connected to the strip and are bent, which thinning, by way of example, may reduce the transverse cross sectional thickness of the rib sections 26 by as much as 10% of the original thickness of the stock material.

After the washer blanks have been provided with pyramidal shapes in the manner described above, the washers are severed from the strip 32 by cooperable tools 47 and 49 along lines slightly inwardly of the score lines 38 and 40 and inwardly of the longitudinal edges of the strip so as to insure the provision of washers having straight and uniform edges. It will be appreciated that relatively little waste material is left in the strip 32. At the same time as the washers are struck from the strip, the corners of the washers are cut diagonally if washers of the type shown in Figs. 2–5 are to be formed; or alternatively, the corners of the washers are deformed downwardly if washers of the type shown in Figs. 6 and 7 are to be formed.

Figs. 10–13 show another embodiment of the present invention which is similar to the embodiments described above as indicated by the application of identical reference numerals with the suffix "b" added to corresponding elements. In this embodiment the pyramidal polygonal washer 10b is provided with a hexagonal configuration, and like the washer described above, the side sections 24b are substantially flat and of uniform transverse cross sectional thickness throughout while the rib or corner corrugations 26b are slightly thinned as shown in an exaggerated manner in Fig. 11. Again, it is to be noted that all of the ribs or corrugations 26b are disposed so that they extend transversely of or at an angle to the grain of the material in the washer body.

In Fig. 13 the method of producing washers 10b is shown. In this embodiment, the grain of the stock material extends longitudinally of the strip 32b so as to insure the location of all of the ribs 26b in transverse relationship with respect to the grain. As before, the strip 32b is first provided with apertures 34b and is then notched to form the prongs or tooth elements 30b. For purposes of illustration, the stock material of the washers 10b is shown relatively thick as compared with the stock material of the washers described above, and the height of the pyramidal washers 10b as compared with the material thickness is less than the height of the above described washers. Under these conditions, the preliminary slitting of the stock material may be eliminated, and the washers 10b are completed by first twisting the prongs 30b about their radial axes and then severing the washers from the strip and simultaneously forming them into pyramidal shapes. It will be appreciated that suitable tools and dies for accomplishing these steps will be provided, which tools need not be shown.

From the foregoing, it will be understood that the washers, as herein shown and described, cover a greater area than a circular washer of the same radius or diameter, and thereby spread out the clamping force over a greater area, accordingly preventing deformation of the workpiece. The washers are sufficiently resilient to avoid the rigid clamping pressure exerted by a flat or solid washer. By virtue of the ribs or corrugations the washers are capable of exerting a relatively great downward pressure without collapsing. Furthermore, the washers will not turn inside out as has been known to occur with prior art conical washers. The efficient use of stock material by virtue of the scrapless construction will be apparent. In each instance, the washer locks the accompanying screw or bolt against retrograde movement by means of the twisted locking teeth; and in the second form of the invention, the downwardly turned corners or tips of the washer serve to lock the washer against rotation relative to the workpiece.

Various changes in structure relative to the exemplary embodiments herein shown and described will no doubt occur to those skilled in the art, and are to be understood as forming a part of the invention insofar as they fall within the spirit and scope of the appended claims.

The invention is claimed as follows:

1. A lock washer including a sheet metal, centrally apertured body of generally pyramidal shape comprising a plurality of like planar body sections inclined toward a common apex at a relatively small acute angle with respect to a plane normal to the washer axis, so as to present a relatively shallow dished washer structure and joined along their adjacent radial margins by integral similarly inclined corner portions of arcuate transverse cross section for counteracting the tendency for said body to flatten when subjected to axial pressure, said corner portions completely traversing the radial extent of the body from the outer margin at the base to the opposite inner margin adjacent said central aperture, and prongs along the inner margin of said body providing teeth normally projecting axially beyond a plane coincident with said inner margin in position to be lockingly engaged by a rotary clamping surface, the radial extent of said prongs substantially following the inclination of the pyramidal body toward said apex at said relatively small acute angle with respect to said normal plane, the extremities of said prongs defining a screw accommodating aperture, the outer margin of the body being of regular polygonal shape and adapted at the base of said corner portions clampingly to impinge a work surface to restrain the washer against rotation with respect thereto, said relatively shallow dished configuration of the washer structure being such as to enable the washer yieldably to resist axial pressure and lockingly impinge a work surface when clamped thereagainst.

2. A lock washer as set forth in claim 1, wherein the outer margin defined by the base of the body thereof is provided with teeth projecting axially beyond a plane coincident with said margin for lockingly impinging a work surface.

3. A lock washer as set forth in claim 1, wherein the corner portions are of less thickness than the adjacent planar body sections.

4. A lock washer as set forth in claim 1, wherein the number of body sections is in excess of four.

5. A lock washer as set forth in claim 1, wherein all of the corner portions are disposed to extend at angles with respect to the grain of the sheet metal.

No references cited.